(12) United States Patent
Subramanian et al.

(10) Patent No.: US 10,021,563 B2
(45) Date of Patent: Jul. 10, 2018

(54) ENHANCED AUTHENTICATION FOR PROVISION OF MOBILE SERVICES

(71) Applicant: ALCATEL-LUCENT CANADA, INC., Ottawa (CA)

(72) Inventors: Ramaswamy Subramanian, Ottawa (CA); Tiru K. Sheth, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 419 days.

(21) Appl. No.: 14/264,923

(22) Filed: Apr. 29, 2014

(65) Prior Publication Data

US 2015/0312761 A1 Oct. 29, 2015

(51) Int. Cl.
*H04W 12/06* (2009.01)
*H04W 12/08* (2009.01)

(52) U.S. Cl.
CPC .......... *H04W 12/06* (2013.01); *H04W 12/08* (2013.01)

(58) Field of Classification Search
CPC ........ H04M 3/00; H04M 13/00; H04M 11/04; H04W 8/04; H04W 12/06; H04W 12/02; H04W 12/10; H04L 63/08; H04Q 7/20
See application file for complete search history.

(56) References Cited

U.S. PATENT DOCUMENTS

| 2002/0035539 | A1* | 3/2002 | O'Connell | G06Q 20/02 705/39 |
|---|---|---|---|---|
| 2003/0027581 | A1* | 2/2003 | Jokinen | H04W 8/04 455/456.1 |
| 2008/0051061 | A1* | 2/2008 | Takahashi | G06F 21/88 455/411 |
| 2010/0128694 | A1* | 5/2010 | Choi-Grogan | H04W 36/0027 370/331 |
| 2011/0202466 | A1* | 8/2011 | Carter | G06Q 20/20 705/67 |
| 2013/0065606 | A1* | 3/2013 | Kurokawa | H04L 65/1016 455/456.1 |
| 2013/0325709 | A1* | 12/2013 | Pollin | G06Q 20/102 705/40 |
| 2013/0346610 | A1* | 12/2013 | Liu | H04L 41/0213 709/225 |

* cited by examiner

*Primary Examiner* — Frantz Bataille
(74) *Attorney, Agent, or Firm* — Kramer & Amado, P.C.

(57) ABSTRACT

Various exemplary embodiments relate to a method, network node, and non-transitory machine-readable storage medium including one or more of the following: instructions for obtaining, by a session establishment device, a subscriber record associated with a subscriber based on the session establishment device receiving a request message for establishment of a session with respect to a user device, wherein the request message includes a received subscriber identifier associated with the subscriber and a received equipment identifier associated with the user device, and wherein the subscriber record stores a stored subscriber identifier and a stored equipment identifier; instructions for comparing the received equipment identifier to the stored equipment identifier to determine whether the user equipment is associated with the subscriber in the subscriber record; and instructions for conditionally rejecting establishment of the session based on the determination of whether the user equipment is associated with the subscriber in the subscriber record.

20 Claims, 6 Drawing Sheets

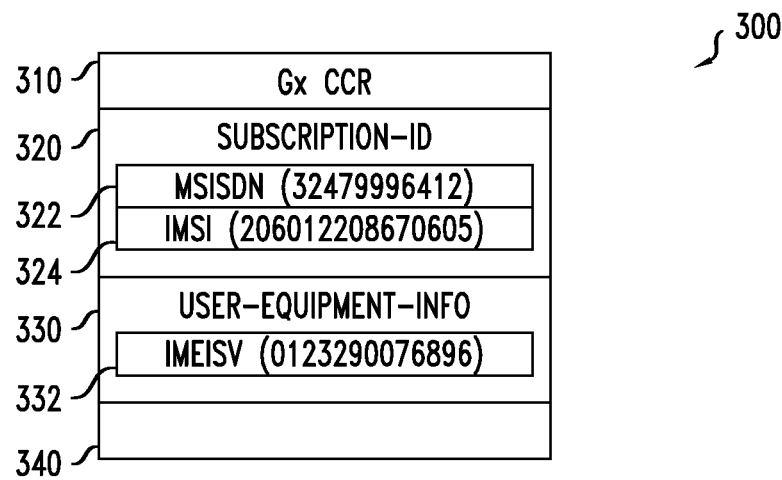

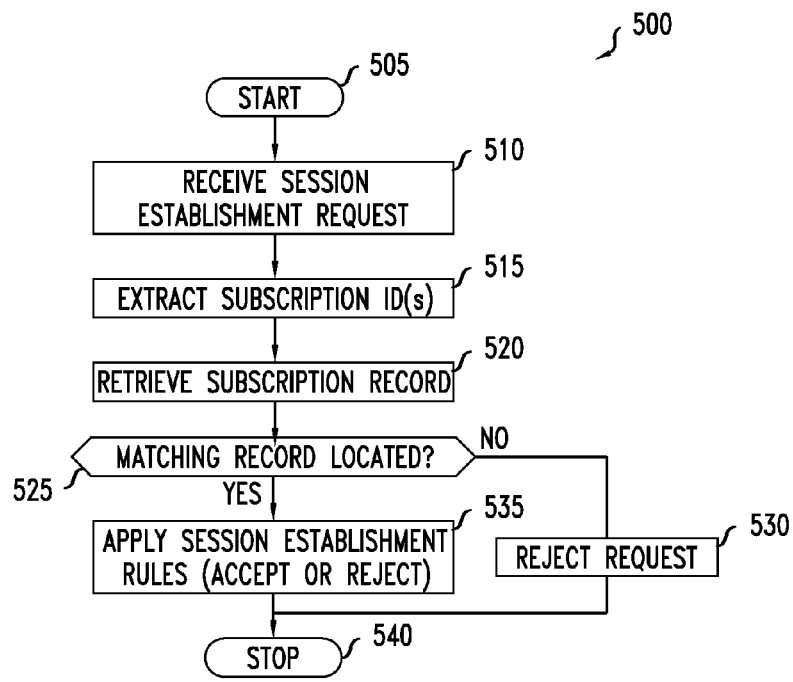

ENHANCED AUTHENTICATION FOR PROVISION OF MOBILE SERVICES

TECHNICAL FIELD

Various exemplary embodiments disclosed herein relate generally to authentication and, more particularly but not exclusively, to authentication of mobile devices in 3G, LTE, and other RADIUS/Diameter networks.

BACKGROUND

In subscription-based networks, subscribers are authenticated prior to provision of services to ensure that only those paying for the service are able to receive it. For example, in many mobile networks, authentication is performed based on a subscription identifier such as an international mobile subscriber identity (IMSI) and a mobile subscriber integrated services digital network number (MSISDN). Rather than requiring the subscriber to enter such an identifier manually prior to service access, these identifiers are typically stored on the mobile device for transmission during session establishment. For example, subscriber identity module (SIM) cards are typically programmed to carry an IMSI and MSISDN for the subscriber-owner of the mobile device. On session establishment, the mobile device automatically transmits these identifiers to a session establishment device, such as a policy and charging rules node (PCRN), for authentication. If the IMSI and MSISDN correspond to an active subscriber record, the PCRN accepts the request as authenticated and proceeds with further steps involved in establishing the requested session.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments described herein relate to a non-transitory machine-readable medium encoded with instructions for performing authentication, the non-transitory machine-readable medium including: instructions for obtaining, by a session establishment device, a subscriber record associated with a subscriber based on the session establishment device receiving a request message for establishment of a session with respect to a user device, wherein the request message includes a received subscriber identifier associated with the subscriber and a received equipment identifier associated with the user device, and wherein the subscriber record stores a stored subscriber identifier and a stored equipment identifier; instructions for comparing the received equipment identifier to the stored equipment identifier to determine whether the user equipment is associated with the subscriber in the subscriber record; and instructions for conditionally rejecting establishment of the session based on the determination of whether the user equipment is associated with the subscriber in the subscriber record.

Various embodiments described herein relate to a session establishment device including: a network interface; a memory device; and a processor in communication with the memory device and the network interface, the processor being configured to: receive, via the network interface, a request message for establishment of a session with respect to a user device, wherein the request message includes a received subscriber identifier associated with a subscriber and a received equipment identifier associated with the user device, obtain a subscriber record associated with the subscriber, wherein the subscriber record stores a stored subscriber identifier and a stored equipment identifier, compare the received equipment identifier to the stored equipment identifier to determine whether the user equipment is associated with the subscriber in the subscriber record, and conditionally rejecting establishment of the session based on the determination of whether the user equipment is associated with the subscriber in the subscriber record.

Various embodiments described herein relate to a method for performing authentication, the method including: receiving, at a session establishment device, a request message for establishment of a session with respect to a user device, wherein the request message includes a received subscriber identifier associated with a subscriber and a received equipment identifier associated with the user device, obtaining a subscriber record associated with the subscriber, wherein the subscriber record stores a stored subscriber identifier and a stored equipment identifier; comparing the received equipment identifier to the stored equipment identifier to determine whether the user equipment is associated with the subscriber in the subscriber record; and conditionally rejecting establishment of the session based on the determination of whether the user equipment is associated with the subscriber in the subscriber record.

Various embodiments are described wherein the subscriber record further stores an indication of whether services are suspended for the subscriber, the non-transitory machine-readable medium further including: instructions for conditionally rejecting establishment of the session based on the indication of whether services are suspended for the subscriber.

Various embodiments additionally include instructions for setting a value of the indication of whether services are suspended for the subscriber in the subscriber record based on a message received from a user-accessible web portal server.

Various embodiments are described wherein the instructions for comparing the received equipment identifier to the stored equipment identifier to determine whether the user equipment is associated with the subscriber in the subscriber record include: instructions for determining whether the stored equipment identifier is a substring of the received equipment identifier.

Various embodiments are additionally include a message processing rule that identifies a comparison between the received equipment identifier to the stored equipment identifier and a result action of rejecting a request based on an outcome of the comparison, wherein the message processing rule comprises the instructions for comparing the received equipment identifier to the stored equipment identifier to determine whether the user equipment is associated with the subscriber in the subscriber record; and the instructions for conditionally rejecting establishment of the session based on the determination of whether the user equipment is associated with the subscriber in the subscriber record include; and instructions for performing interpreted evaluation of the message processing rule.

Various embodiments are described wherein the received equipment identifier is an international mobile station equipment identity (IMEI) and the received subscriber identifier includes at least one of an international mobile subscriber identity (IMSI) and a mobile subscriber integrated services digital network number (MSISDN).

Various embodiments additionally include instructions for comparing the received subscriber identifier to the stored subscriber identifier to determine whether the subscriber identifier is associated with the subscriber in the subscriber record; and instructions for conditionally rejecting establishment of the session based on the determination of whether the subscriber identifier is associated with the subscriber in the subscriber record.

BRIEF DESCRIPTION OF THE DRAWINGS

In order to better understand various exemplary embodiments, reference is made to the accompanying drawings, wherein:

FIG. 3 illustrates an exemplary message to be authenticated by a session establishment device;

FIG. 4 illustrates an exemplary subscriber record;

FIG. 5 illustrates an exemplary method for processing a session establishment request;

FIG. 6 illustrates an exemplary rule set for establishing an IP-CAN session;

To facilitate understanding, identical reference numerals have been used to designate elements having substantially the same or similar structure or substantially the same or similar function.

DETAILED DESCRIPTION

The use of SIM cards or other pre-programmed identifiers for authentication serves to relieve the subscriber from having to enter the information each time a mobile device establishes a session for service. While convenient, pre-programmed identifiers also creates opportunities for unauthorized access to the network. For example, if a SIM card or a mobile device containing the SIM card is stolen, the thief may easily authenticate as the subscriber using the pre-programmed identifiers until the subscriber is able to take remedial action such as contacting the service provider and requesting device deactivation. As another example, a group of people may share a subscription by physically swapping a SIM card between devices or by using multiple SIM cards with the same pre-programmed identifiers. Various embodiments described herein provide enhanced authentication schemes that prevent or otherwise counteract these and other types of unauthorized network access.

The description and drawings presented herein illustrate various principles. It will be appreciated that those skilled in the art will be able to devise various arrangements that, although not explicitly described or shown herein, embody these principles and are included within the scope of this disclosure. As used herein, the term, "or," as used herein, refers to a non-exclusive or (i.e., or), unless otherwise indicated (e.g., "or else" or "or in the alternative"). Additionally, the various embodiments described herein are not necessarily mutually exclusive and may be combined to produce additional embodiments that incorporate the principles described herein.

Figure 1:
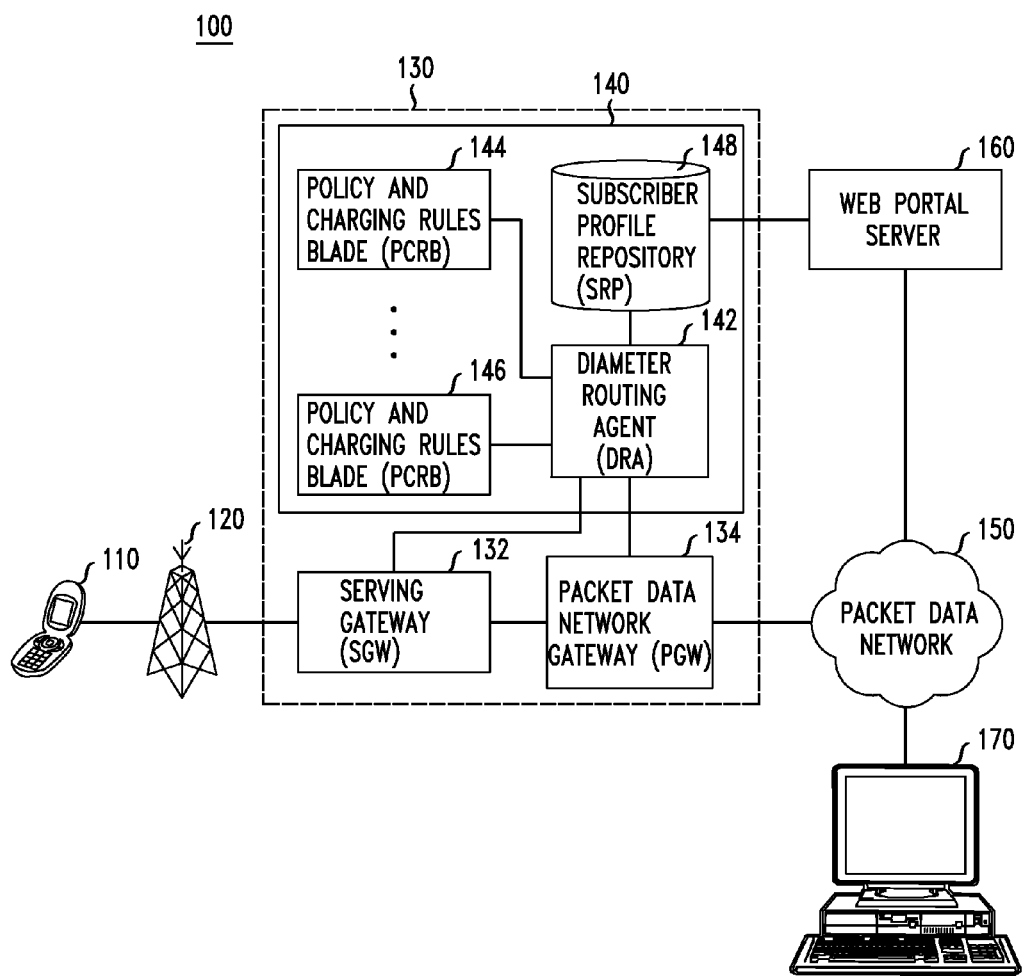
FIG. 1 illustrates an exemplary network environment for providing subscription services.

FIG. 1 illustrates an exemplary network environment 100 for providing subscription services. In various embodiments, the environment 100 may include a public land mobile network (PLMN). The environment 100 may be telecommunications network or other network for providing access to various services and may include user equipment 110, one or more base stations 120, an evolved packet core (EPC) 130, a packet data network 150.

The user equipment 110 may be a device that communicates with packet data network 150 for providing the end-user with a data service. Such data service may include, for example, voice communication, text messaging, multimedia streaming, and Internet access. More specifically, in various exemplary embodiments, the user equipment 110 is a personal or laptop computer, wireless email device, cell phone, tablet, television set-top box, or any other device capable of communicating with other devices via EPC 130.

The base station 120 may be a device that enables communication between user equipment 110 and EPC 130. For example, the base station 120 may be a base transceiver station such as an evolved nodeB (eNodeB) as defined by the relevant 3GPP standards. Thus, the base station 120 may be a device that communicates with user equipment 110 via a first medium, such as radio waves, and communicates with the EPC 130 via a second medium, such as Ethernet cable. The base station 120 may be in direct communication with EPC 130 or may communicate via a number of intermediate nodes (not shown). In various embodiments, multiple base stations (not shown) may be present to provide mobility to the user equipment 110. Note that in various alternative embodiments, the user equipment 110 may communicate directly with EPC 130. In such embodiments, the base station 120 may not be present.

The evolved packet core (EPC) 130 may be a device or network of devices that provides user equipment 110 with gateway access to the packet data network 150. The EPC 130 may further charge a subscriber for use of provided data services and ensure that particular quality of experience (QoE) standards are met. Thus, the EPC 130 may be implemented, at least in part, according to the relevant 3GPP standards. The EPC 130 may include a serving gateway (SGW) 132, a packet data network gateway (PGW) 134, and a session control device 140.

The serving gateway (SGW) 132 may be a device that provides gateway access to the EPC 130. The SGW 132 may be one of the first devices within the EPC 130 that receives packets sent by the user equipment 110. Various embodiments may also include a mobility management entity (MME) (not shown) that receives packets prior to the SGW 132. The SGW 132 may forward such packets toward the PGW 134. The SGW 132 may also perform a number of functions such as, for example, managing mobility of the user equipment 110 between multiple base stations (not shown) and enforcing particular quality of service (QoS) characteristics for each flow being served. In various implementations, such as those implementing the Proxy Mobile IP standard, the SGW 132 may include a Bearer Binding and Event Reporting Function (BBERF). In various exemplary embodiments, the EPC 130 may include multiple SGWs (not shown) and each SGW may communicate with multiple base stations (not shown).

The packet data network gateway (PGW) 134 may be a device that provides gateway access to the packet data network 150. The PGW 134 may be the final device within the EPC 130 that receives packets sent by the user equipment 110 toward the packet data network 150 via the SGW 132. The PGW 134 may include a policy and charging enforcement function (PCEF) that enforces policy and charging control (PCC) rules for each service data flow (SDF). Therefore, the PGW 134 may be a policy and charging enforcement node (PCEN). The PGW 134 may include a number of additional features such as, for example, packet filtering, deep packet inspection, and subscriber charging support. The PGW 134 may also be responsible for requesting resource allocation for unknown application services.

The session control device 140 may be a device that provides various management or other functions within the EPC 130. For example, the session control device 140 may provide one or more Policy and Charging Rules Functions (PCRF) and as such may constitute one or more Policy and Charging Rules Nodes (PCRNs). In various embodiments, the session control device 140 may include an Alcatel Lucent 5780 Dynamic Services Controller (DSC). According to some embodiments, the session control device 140 may include a diameter routing agent (DRA) 142, a plurality of policy and charging rules blades (PCRBs) 144, 146, and a subscriber profile repository (SPR) 148. It will be apparent that various alternative configurations are possible. For example, the session control device 140 may implement only a single PCRF, rather than the multiple PCRBs 144-146, omit the DRA 142, and may interface with an external SPR (not shown) instead of implementing the integrated SPR 148.

As will be described in greater detail below, the DRA 142 may be an intelligent Diameter Routing Agent. As such, the DRA 142 may receive, process, and transmit various Diameter messages. The DRA 142 may include a number of user-defined rules that govern the behavior of DRA 142 with regard to the various Diameter messages DRA 142 may encounter. Based on such rules, the DRA 142 may operate as a relay agent, proxy agent, or redirect agent. For example, the DRA 142 may relay received messages to an appropriate recipient device. Such routing may be performed with respect to incoming and outgoing messages, as well as messages that are internal to the session control device.

The policy and charging rules blades (PCRB) 144, 146 may each be a device or group of devices that receives requests for application services, generates PCC rules, and provides PCC rules to the PGW 134 or other PCENs (not shown). The PCRBs 144, 146 may be in communication with one or more application functions (AFs) (not shown) via an Rx Diameter application interface. A PCRB 144, 146 may receive an application request in the form of an Authentication and Authorization Request (AAR) from an AF. Upon receipt of an AAR, the PCRB 144, 146 may generate at least one new PCC rule for fulfilling the application request.

The PCRB 144, 146 may also be in communication with SGW 132 and PGW 134 via a Gxx and a Gx Diameter application interface, respectively. The PCRB 144, 146 may receive an application request in the form of a credit control request (CCR) from the SGW 132 or the PGW 134. As with an AAR, upon receipt of a CCR, the PCRB 144, 146 may generate at least one new PCC rule for fulfilling the application request. In various embodiments, the AAR and the CCR may represent two independent application requests to be processed separately, while in other embodiments, the AAR and the CCR may carry information regarding a single application request and PCRB 144, 146 may create at least one PCC rule based on the combination of the AAR and the CCR. In various embodiments, the PCRB 144, 146 may be capable of handling both single-message and paired-message application requests.

Upon creating a new PCC rule or upon request by the PGW 134, PCRB 144, 146 may provide a PCC rule to the PGW 134 via the Gx interface. In various embodiments, such as those implementing the proxy mobile IP (PMIP) standard for example, the PCRB 144, 146 may also generate QoS rules. Upon creating a new QoS rule or upon request by the SGW 132, PCRB 144, 146 may provide a QoS rule to SGW 132 via the Gxx interface.

The subscriber profile repository (SPR) 148 may be a device that stores information related to subscribers to the subscriber network 100. Thus, SPR 148 may include a machine-readable storage medium such as read-only memory (ROM), random-access memory (RAM), magnetic disk storage media, optical storage media, flash-memory devices, and/or similar storage media. The SPR 148 may be a component of one of the PCRBs 144, 146 or may constitute an independent node within EPC 130 or session control device 140. Data stored by the SPR 148 may include subscriber information such as identifiers for each subscriber (e.g. IMSI and MSISDN identifiers), identifiers for devices associated with the subscriber (e.g., IMEI identifiers), bandwidth limits, charging parameters, subscriber priority, and other custom data.

The packet data network 150 may be any network for providing data communications between user equipment 110 and other devices connected to packet data network 150, such as application functions (not shown). The packet data network 150 may further provide, for example, phone or Internet service to various user devices in communication with the packet data network 150.

As shown, the environment also includes a web portal server 160 accessible by an end user device 170 for performing functions such as account inquiries and updates by an end user. For example, a subscriber, wishing to inquire as to the current month's bill for service, may operate the end user device 170 to access the web portal server 160 via the packet data network 150 (or another network, not shown). Such access may include authentication using a user name and password to identify the subscriber account being accessed and to authenticate the individual requesting access. Alternatively, such authentication may be performed according to other methods such as providing an IMSI or MSISDN identifier.

In various embodiments, the end user device may be virtually any device capable of accessing the web portal server 160 such as, for example, a personal computer, tablet, or mobile phone and, in some cases, may be the user equipment 110 itself accessing the packet data network 150 via the EPC 130 or via another channel (e.g., through a WiFi connection). The web portal server 160 may also be any device capable of providing a web portal application to the end user device 170 such as, for example, a server, blade, or personal computer configured with web server software.

In various embodiments, the web portal server 160 may be configured to access data in the SPR 148. For example, as will be described in greater detail below, the user may indicate to the web portal server 160 that service is to be suspended for the account. The user may desire such a service suspension in the case where the user equipment 110 has been stolen. To deactivate the service, the web portal server 160 may communicate with the SPR 148 via an application programming interface (API) implemented on the SPR 148 that an indication of service suspension should be added to the subscriber's record.

As will be described in greater detail below, the session control device 140 implements an enhanced authentication scheme. According to some embodiments, upon the user equipment 110 attaching to the network environment 100 and requesting authentication, the session control device 140 retrieves a subscriber profile record for the identified subscriber and determines whether the record includes an indication of service suspension should be added to the subscriber's record. If so, the session control device 140 denies authentication and, consequently, access to the service network. As such, a subscriber is able to disable service for a stolen mobile device and SIM card by accessing the web portal server 160 in the manner described above.

According to some embodiments, the session control device 140 additionally or alternatively verifies that a reported equipment identifier is associated with the identified subscriber in the associated subscription profile record. If the equipment identifier is not recorded in the retrieved subscriber record, the session control device denies authentication and, consequently, access to the service network. As such, the session control device 140 may deny service when a SIM card is inserted into an unexpected device, such as in the case of a stolen or shared SIM card.

Figure 2:
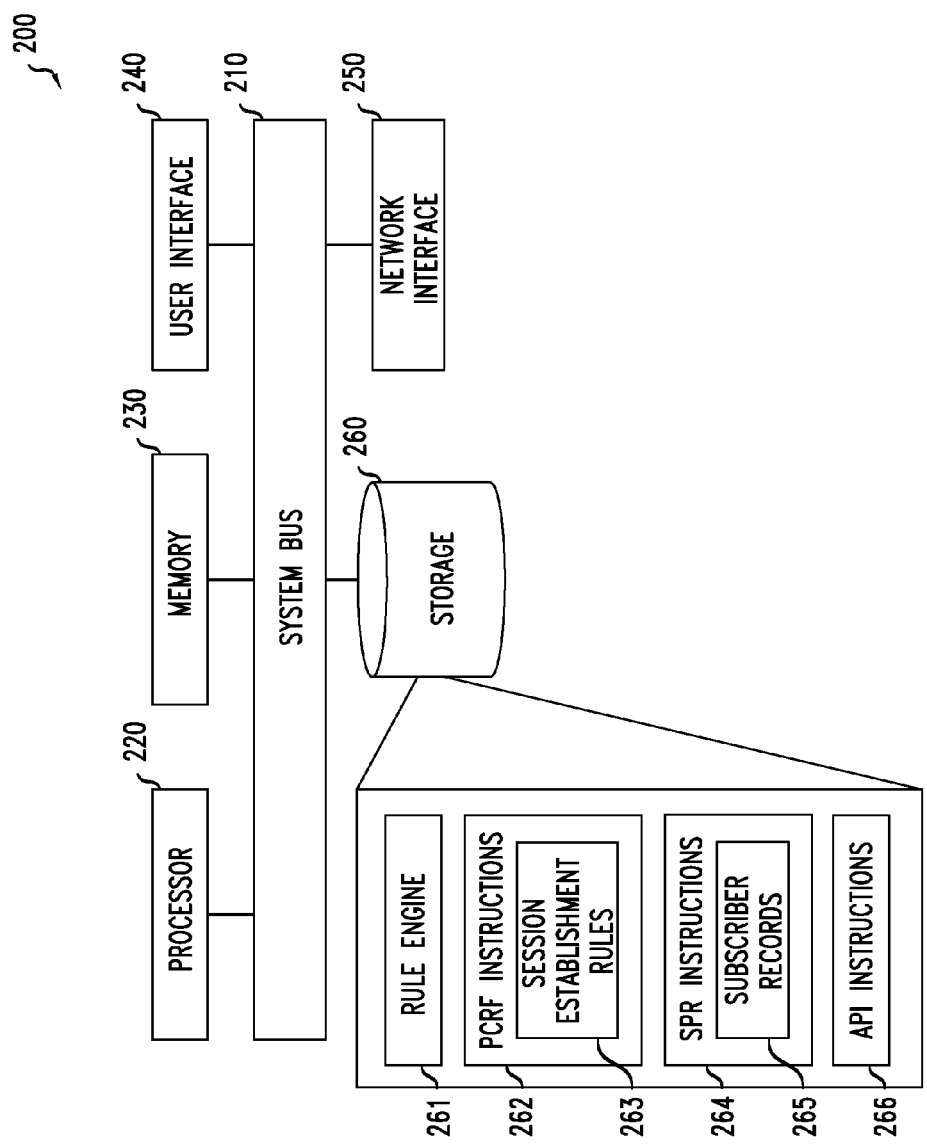
FIG. 2 illustrates a hardware diagram of an exemplary session establishment device.

FIG. 2 illustrates a hardware diagram 200 of an exemplary session establishment device. The exemplary hardware 200 may correspond to the session control device 140 of FIG. 1 or to one or more of the PCRBs 144, 146 within the session control device 140. It will be appreciated that similar hardware may also be used to implement the web portal server 160. As shown, the hardware device 200 includes a processor 220, memory 230, user interface 240, network interface 250, and storage 260 interconnected via one or more system buses 210. It will be understood that FIG. 2 constitutes, in some respects, an abstraction and that the actual organization of the components of the hardware 200 may be more complex than illustrated.

The processor 220 may be any hardware device capable of executing instructions stored in memory 230 or storage 260, or otherwise capable of processing data. As such, the processor 220 may include a microprocessor, field programmable gate array (FPGA), application-specific integrated circuit (ASIC), or other similar devices.

The memory 230 may include various memories such as, for example L1, L2, or L3 cache or system memory. As such, the memory 230 may include static random access memory (SRAM), dynamic RAM (DRAM), flash memory, read only memory (ROM), or other similar memory devices.

The user interface 240 may include one or more devices for enabling communication with a user such as an administrator. For example, the user interface 240 may include a display, a mouse, and a keyboard for receiving user commands. In various embodiments, the user interface 240 may include a command line interface (CLI) or graphical user interface (GUI) that is presentable to a user via local input/output devices or via the network interface 250.

The network interface 250 may include one or more devices for enabling communication with other hardware devices. For example, the network interface 250 may include a network interface card (NIC) configured to communicate according to the Ethernet protocol. Additionally, the network interface 250 may implement a TCP/IP or Diameter stack for communication according to the TCP/IP or Diameter protocols, respectively. Various alternative or additional hardware or configurations for the network interface 250 will be apparent.

The storage 260 may include one or more machine-readable storage media such as read-only memory (ROM), random-access memory (RAM), magnetic disk storage media, optical storage media, flash-memory devices, or similar storage media. In various embodiments, the storage 260 may store instructions for execution by the processor 220 or data upon with the processor 220 may operate. For example, the storage 260 may store rules engine instructions 261 for defining a general purpose rules engine utilized by other functionality. Exemplary rules engine instructions will be described in greater detail below with respect to FIG. 5. Where the hardware 200 implements one or more PCRFs, the storage 260 also includes PCRF instructions 262 for performing various functions associated with the PCRF in the relevant 3GPP standards or that are otherwise desirable. For example, the PCRF instructions 262 may include instructions for receiving and processing requests for establishment of new IP connectivity access network (IP-CAN) sessions. In doing so, the PCRF instructions 262 may be configured to utilize the rules engine instructions 262 for evaluating session establishment rules 263. In various embodiments, the session establishment rules 263 may be modifiable by a user via the user interface 240 or network interface 250. As such, the use of the rules engine 261 may provide users, such as network administrators, the ability to flexibly define the behavior of the PCRF instructions 262. After defining rule, the rule engine instruction evaluate the rules at run time by interpreting various condition statements and commands specified therein. In other words, the rule engine performs an interpreted evaluation of the rules. Exemplary session establishment rules will be described in greater detail below with respect to FIG. 6.

Where the hardware 200 implements an SPR, the storage 260 additionally or alternatively includes SPR instructions 264 for performing various functions associated with the SPR in the relevant 3GPP standards or that are otherwise desirable. For example, the SPR instructions 264 may include instructions for storing, writing, and retrieving various subscriber records 265. An exemplary subscriber record will be described in greater detail below with respect to FIG. 4. In various embodiments, the SPR instructions additionally include API instructions 266 for receiving API calls to modify subscriber records. Exemplary API instructions will be described below in greater detail with respect to FIG. 9.

It will be apparent that various information described as stored in the storage 260 may be additionally or alternatively stored in the memory 230. For example, the PCRF instructions 262 may be stored, at least partially, in memory 230 for execution by the processor 220. As another example, in embodiments wherein the hardware 400 interfaces with an external SPR rather than implementing an integrated SPR, the memory 230 may instead store those subscriber records 265 that have been fetched for processing. In this respect, the memory 230 may also be considered to constitute a "storage device" and the storage 260 may be considered to constitute a "memory device." Various other arrangements will be apparent. Further, the memory 230 and storage 260 may both be considered to be "non-transitory machine-readable media." As used herein, the term "non-transitory" will be understood to exclude transitory signals but to include all forms of storage, including both volatile and non-volatile memories.

While the hardware device 200 is shown as including one of each described component, the various components may be duplicated in various embodiments. For example, the processor 220 may include multiple microprocessors that are configured to independently execute the methods described herein or are configured to perform steps or subroutines of the methods described herein such that the multiple processors cooperate to achieve the functionality described herein. In some embodiments, such as those wherein the hardware device 200 is implemented in a cloud computing architecture, components may be physically distributed among different devices. For example, the processor 220 may include a first microprocessor in a first data center and a second microprocessor in a second data center. Various other arrangements will be apparent.

FIG. 3 illustrates an exemplary message 300 to be authenticated by a session establishment device. The message 300 shown in a Gx Diameter application credit control request (CCR); however various additional types of messages for session establishment or other authentication will be apparent.

As shown, the message 300 includes a Gx CCR header 310 and a Subscription-ID attribute-value pair (AVP) 320 for identifying the subscriber to which the message 300 pertains. The Subscription-ID AVP 320 includes two sub-AVPs for specifying two different identifiers of the subscriber. The first sub-AVP is an AVP 322 specifying an MSISDN of "32479996412," while the second sub-AVP is an AVP 324 specifying an IMSI of "206012208670605." Generally, one or more of these identifiers may be used to locate a subscriber record for the associated subscriber.

The message also includes a User-Equipment-Info AVP 330 which, in turn, includes a sub-AVP 332 specifying an IMEI Software Version (IMEISV) of "0123290076896." As will be seen according to the methods described below, this value may be used for performing enhanced authentication. It will further be apparent that the message 300 may include numerous additional AVPs 340 such as, for example, AVPs defining the specific service or session to be established or requested QoS parameters. It will also be apparent that the message of FIG. 3 is merely an example and that various alternative AVP values may be present.

FIG. 4 illustrates an exemplary subscriber record 400. The exemplary subscriber record 400 may be a record stored in an SPR such as the SPR 148 of FIG. 1. As shown, the subscriber record 400 is associated with a subscriber having a user ID 410 of "TestSub." The record 400 also includes multiple subscription IDs including an IMSI of "32479996412" and an IMSI of "206012208670605." Thus, the subscriber record 400 may correspond to the subscribed identified by the exemplary message 300 of FIG. 3.

The subscriber record 400 also includes multiple custom data fields 440-470. The custom data fields may be available in various SPR implementations to carry administrator-defined information. For example, as shown in the example of FIG. 4, the custom data section includes a status field 440 set to a value of enabled (indicating that the subscriber has not requested suspension of service), an MSISDN field 450 set to a value of "32479996412," an IMSI field 460 set to a value of "206012208670605," and an IMEI value set to a value of "3032187995781" indicating that the subscriber is expected to access the network using a device having this IMEI. Thus, if the IMEI field 470 includes only the value illustrated, the session control device will determine, according to some embodiments, that the exemplary message 300 of FIG. 3 will not be authenticated because the message 300 is received from a different device (IMEISV "0123290076896") than the expected device indicated by the subscriber record (IMEI "3032187995781").

It will be apparent that different implementations of the methods described herein may utilize different subscriber records, including different uses of the custom data fields 440-470, if any. For example, the exemplary subscriber record 400 is shown to duplicate the MSISDN and IMSI values across two separate fields, respectively (i.e., fields 410 and 450; and field 420 and 460). Such a configuration may be beneficial, for example, in implementations that utilize a rules engine for authentication but where the rules engine is unable to access the subscription ID fields 420, 430 directly. In such embodiments, it may be beneficial to provide the MSISDN and IMSI values separately in rule engine-accessible custom data fields. In other embodiments, such as embodiments where the authentication scheme may access the subscription ID fields 420, 430 directly or where no verification of the MSISDN and IMSI is performed (apart from an initially retrieving the record from the SPR based on these identifiers), separate custom fields 450, 460 for the MSISDN and IMSI may not be provided. As another example, the IMEI may be provided in a standardized or otherwise non-custom field specifically purposed to store the IMEI. Various other modifications will be apparent.

FIG. 5 illustrates an exemplary method 500 for processing a session establishment request. Specifically, the method may be used by a session control device such as the session control device 140 of FIG. 1 or the hardware device 200 of FIG. 2 in various implementations that utilize a rule engine to perform enhanced authentication.

The method 500 begins in step 505 and proceeds to step 510 where the session control device receives a message requesting establishment of a new session. For example, the message may be a Gx CCR, a Gxx CCR, or an RX AAR. Next, in step 515, the session control device extracts any subscription identifiers from the received message. For example, the session control device may locate a Subscription-ID AVP in the received message and extract any identifiers that are present such as, for example, an MSISDN and IMSI. Then, in step 520, the session control device retrieves a subscription record associated with the extracted subscription identifiers by, for example, searching an integrated SPR or querying an external SPR for the record. If the session control device determines in step 525 that no matching record can be found, it may be assumed that the message cannot be authenticated. The session control device thus rejects the request in step 530. As such, the retrieval of the subscription record in step 520 may be viewed as an implicit authentication of the provided subscription identifiers. It will be apparent that, in various alternative embodiments, a record may be retrieved based on information other than a received MSISDN and IMSI; in such embodiments, no implicit authentication of these specific values is achieved in step 520.

Continuing with exemplary method 500, if a matching record is located for the subscription IDs, the method 500 proceeds from step 525 to step 535. In step 535, the session control device invokes the rules engine to apply any relevant session establishment rules, which may involve further authentication of the received message as will be described in greater detail below with respect to FIG. 6. Based on the application of these rules, the session control device may determine that the requested session should be established or rejected. After implementing the outcome of the rule engine, the method 500 proceeds to end in step 540.

FIG. 6 illustrates an exemplary rule set 600 for establishing an IP-CAN session. The rule set 600 may be evaluated upon receiving a request for IP-CAN session establishment, such as in step 535 of the exemplary method 500. As shown, the rule set 600 is stored in a table form; it will be apparent that the rules may be stored in virtually any form such as, for example, in a database, a tree structure, an array, a series of linked lists, or as a block of text defining code or pseudocode.

The exemplary rules 620, 630 of the rule set 600 each include two parts: a criteria section 605 and an action section 610. The criteria section 605 may specify one or more conditions for evaluation by the rule engine to determine whether a rule is applicable. These conditions may include references to various context data available at run-time. For example, the conditions may reference the contents of the retrieved subscriber record for the request and the contents of the request itself. Various other context data for evaluation in the criteria section will be apparent.

The action section 610 may specify one or more actions to be taken by the rules engine or the requesting process or device when a rule is determined to be applicable. As such, the action section 610 may include instructions back to the requestor (e.g., the PCRF process of the session control device) or instructions to the rule engine itself.

As an example, the illustrated rules 620, 630 implement an enhanced authentication scheme. The first rule 620 specifies four conditions which must be true before the request is accepted as authentic. Specifically, the first rule 620 indicates that when 1) the retrieved record includes a status of "Enabled;" 2) the retrieved record MSISDN matches the MSISDN carried by the received message; 3) the retrieved record IMSI matches the IMSI carried by the received message; and 4) the retrieved record IMEI is a substring of the IMEISV carried by the received message, the rule engine will indicate that the received message is authentic and may be accepted. Rule 630 indicates that, otherwise, the request will be rejected as non-authentic. Thus, the rules 620, 630 may be viewed as simultaneously constituting instructions for conditionally rejecting a request based on the status field, instructions for conditionally rejecting a request based on the MSISDN, instructions for conditionally rejecting a request based on the IMSI, and instructions for conditionally rejecting a request based on the IMEI. Various alternative rules will be apparent. For example, as shown, the rule 620 tests whether the message IMEISV contains the subscriber record IMEI as a substring. By doing so, the authentication may be based on the IMEI portion of the equipment information only, without regard for the software version. In various alternative embodiments, authentication may be performed based on the full IMEISV with a simple equivalence operator.

It will also be noted that the outcome of applying rule 620 may not necessarily be establishment of an IP-CAN session. Instead, there are many other factors that may cause the session control node to reject or counteroffer even an authentic request such as, for example, lack of network resources or throttling of the subscriber due to an unusually high rate of subscriber activity.

Figure 7:
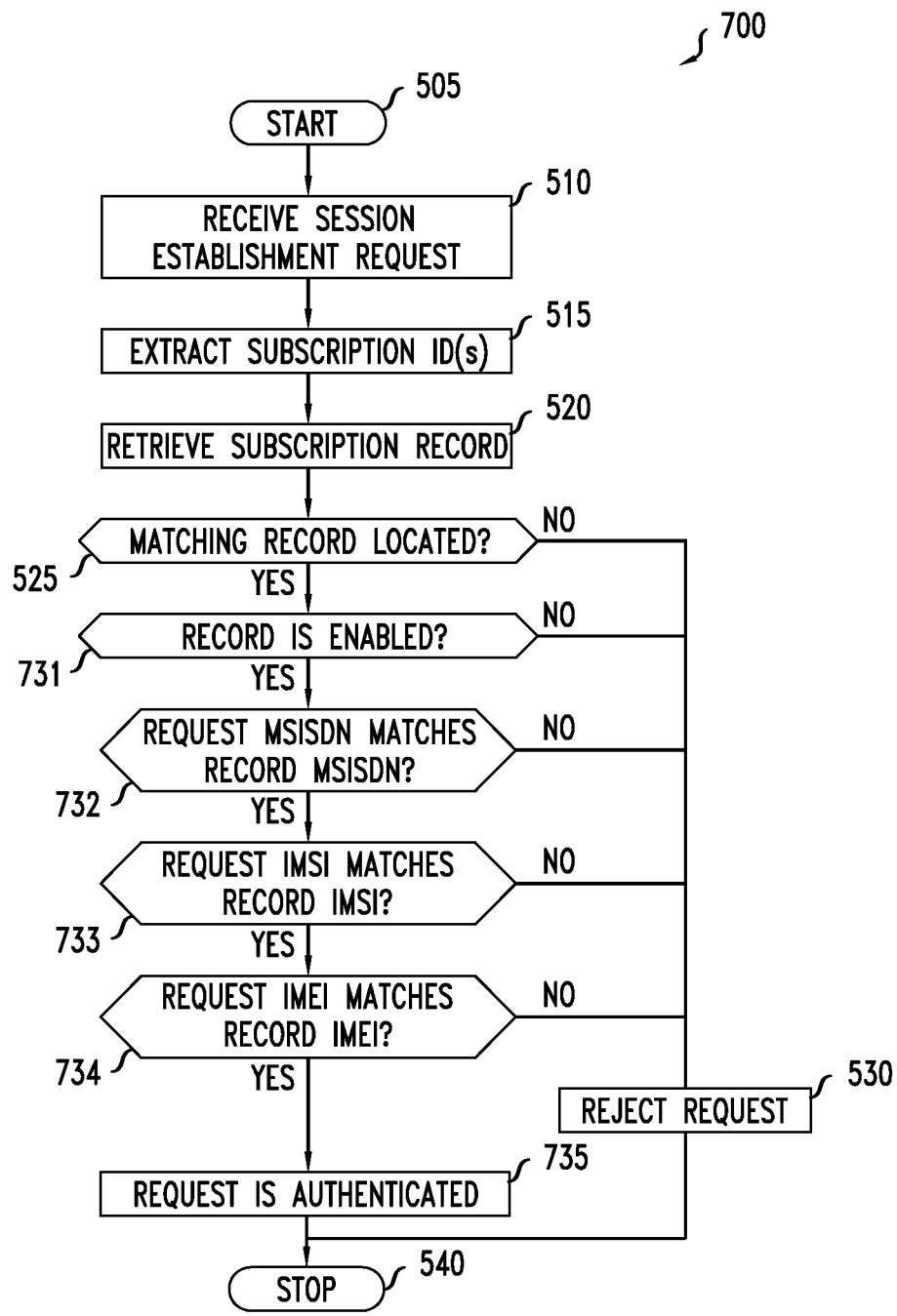
FIG. 7 illustrates an alternative exemplary method for processing a session establishment request.

While the enhanced authentication techniques described herein are presented with respect to a rules engine, it will be understood that nodes that do not implement a rules engine may nonetheless utilize the enhanced authentication techniques. For example, one or more of the techniques may be hard-coded into the operation of the session control device. FIG. 7 illustrates an alternative exemplary method 700 for processing a session establishment request.

As shown, the alternative method 700 is similar to the first exemplary method 500; many of the steps are similar or identical. However, instead of invoking a rules engine as the first embodiment's method 500 does in step 535, the alternative method 700 proceeds from step 525 to step 731 when a matching record is located.

In step 731, the session control node determines whether the located record includes a status of "enabled." If not, the method proceeds to reject the request in step 530. Otherwise, the method 700 proceeds to step 732.

In step 732, the session control node determines whether the MSISDN in the located record matches the MSISDN carried by the received message (e.g., equivalence). If not, the method proceeds to reject the request in step 530. Otherwise, the method 700 proceeds to step 733.

In step 733, the session control node determines whether the IMSI in the located record matches the IMSI carried by the received message (e.g., equivalence). If not, the method proceeds to reject the request in step 530. Otherwise, the method 700 proceeds to step 734.

In step 734, the session control node determines whether the IMEI in the located record matches the IMEI carried by the received message (e.g., substring matching, as described above). If not, the method proceeds to reject the request in step 530. Otherwise, the method 700 proceeds to step 735.

In step 735, the session control device determines that the request is authentic and proceeds to perform additional processing of the session establishment request. For example, the session control device may proceed to establish, reject, or counteroffer the requested session. The method 700 then proceeds to end in step 540.

It will be apparent that various embodiments may utilize some of the enhanced authentication steps described herein but not others. For example, in some embodiments where implicit authentication of the MSISDN and IMSI are deemed sufficient, a separate verification of these values in the second and third lines of the criteria of rule 620 or step 732, 733 of the alternative method 700 may be omitted. Further, some embodiments may omit IMEI verification or may omit verification of the status field.

Figure 8:
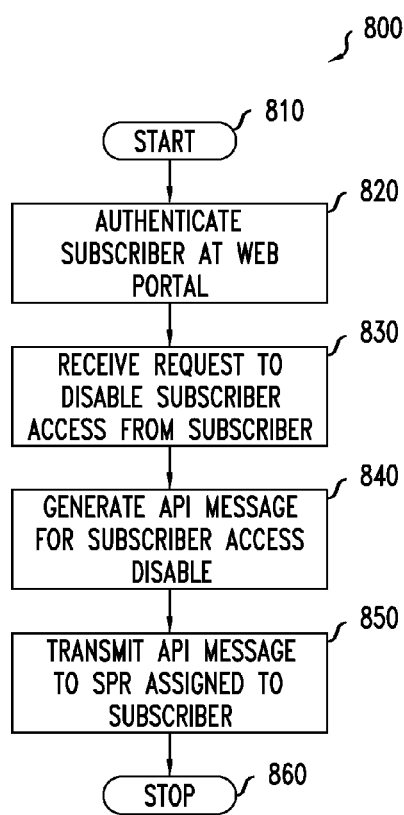
FIG. 8 illustrates an exemplary method for instructing a subscription profile repository to suspending services for a subscriber.

As noted above, the status field used for enhanced authentication may be set by a subscriber via a web portal server, such as the web portal server 160 of the exemplary environment 100. As such, the web portal server may be provided with instructions for communicating such a change to the relevant SPR. FIG. 8 illustrates an exemplary method 800 for instructing a subscription profile repository to suspending services for a subscriber.

The method 800 begins in step 810 and proceeds to step 820 where the web portal server authenticates a subscriber. For example, the web portal server may receive a user name and password from the subscriber, entered via a log-in page. In step 830, the web portal server receives a request from the subscriber to disable access for the subscriber's account. For example, the subscriber may click a link or button that is identified as transmitting such a request. Next, in step 840, the web portal server generates an API message to indicate that the status field of the subscriber's subscriber record should be set to disabled. Then, in step 850, the web portal server transmits the API message to the SPR that stores the subscriber record for the subscriber. The method 800 then proceeds to end in step 860.

Figure 9:
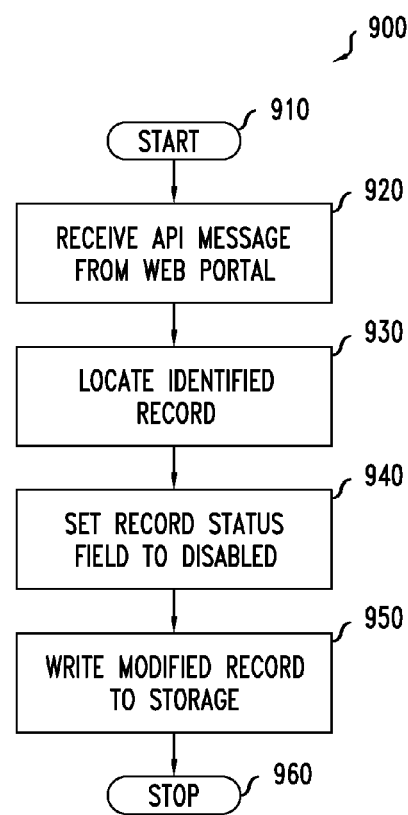
FIG. 9 illustrates an exemplary method for processing an instruction to suspend services for a subscriber.

FIG. 9 illustrates an exemplary method 900 for processing an instruction to suspend services for a subscriber. The method may be performed by an SPR, such as the SPR 148 of the exemplary environment upon receiving an API message, such as the API message transmitted in step 850 of exemplary method 800.

The method 900 begins in step 910 and proceeds to step 920 where the SPR receives an API message from a web portal server. As will be described in the example below, the API message may identify the record to be modified, the field within the record to be modified, and the new value for the identified field. Next, in step 930, the SPR locates the identified record. In step 940, the SPR sets the record status to 'disabled' based on the remote procedure call or other instruction carried by the API message. Finally, the SPR commits the modified subscriber record back to storage such that future authentications for the subscribed may take into account the now-disabled status of the record. The method 900 then ends in step 960.

It will be apparent that virtually any API may be used to facilitate communication between the web portal server and the SPR as long as both devices are able to understand the communications used. In various embodiments, the API may be implemented as a simple object access protocol (SOAP) API. As such, the web portal server may transmit an API message including a SOAP XML file such as, for example, the following:

```
<soapenv:Envelope xmlns:soapenv="http://schemas.xmlsoap.org/soap/envelope/"
xmlns:com="http://www.alcatellucent.com/dsc/provisioningapi/common"
xmlns:sub="http://www.alcatellucent.com/dsc/provisioningapi/60/subscriber">
    <soapenv:Header>
      <com:header>
        <com:clientAppId>?</com:clientAppId>
        <com:requestId>?</com:requestId>
      </com:header>
    </soapenv:Header>
    <soapenv:Body>
      <sub:updateCustomDataEntry>
        <sub:subscriberId>
          <sub:userId>TestSub</sub:userId>
        </sub:subscriberId>
        <sub:customData>
          <sub:name>STATUS</sub:name>
          <sub:value>
            <sub:type>STRING</sub:type>
            <sub:data>Disabled</sub:data>
          </sub:value>
        </sub:customData>
      </sub:updateCustomDataEntry>
    </soapenv:Body>
</soapenv:Envelope>
```

Thus, after receiving the above API message, the SPR 148 may update the status field 440 of the exemplary subscriber record 400 to carry the value "Disabled." Thereafter, an authentication of a message for this subscriber according the exemplary rule set 600 or the alternative method 700 will result in a rejection of the request.

According to the foregoing, various embodiments enable enhanced authentication of a subscriber request. In particular, by verifying an equipment identifier reported in a request message against an expected equipment identifier reported in a subscriber record, a system may be configured to reject session requests where a SIM card has been shared or stolen. Further, by authenticating against a status value in the subscriber record, a subscriber may be provided with an easy means to deactivating service in the event that the subscriber's user equipment is stolen. Various additional benefits will be apparent in view of the foregoing.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A non-transitory machine-readable medium encoded with instructions for performing authentication, the non-transitory machine-readable medium comprising:
   instructions for obtaining, by a session establishment device, a subscriber record associated with a subscriber based on the session establishment device receiving a request message for establishment of a session with respect to a user device, wherein the request message includes a received subscriber identifier associated with the subscriber and a received international mobile station equipment identity software version (IMEISV) associated with the user device, and wherein the subscriber record stores a stored subscriber identifier and a stored IMEI;
   instructions for comparing the received IMEISV to the stored IMEI to determine whether the user equipment is associated with the subscriber in the subscriber record; and instructions for conditionally rejecting establishment of the session based on the determination of whether the user equipment is associated with the subscriber in the subscriber record.

2. The non-transitory machine-readable medium of claim 1, wherein the subscriber record further stores an indication of whether services are suspended for the subscriber, the non-transitory machine-readable medium further comprising:
instructions for conditionally rejecting establishment of the session based on the indication of whether services are suspended for the subscriber.

3. The non-transitory machine-readable medium of claim 2, further comprising:
instructions for setting a value of the indication of whether services are suspended for the subscriber in the subscriber record based on a message received from a user-accessible web portal server.

4. The non-transitory machine-readable medium of claim 1, wherein the instructions for comparing the received IMEISV to the stored IMEI to determine whether the user equipment is associated with the subscriber in the subscriber record comprise:
instructions for determining whether the stored IMEI is a substring of the received IMEISV.

5. The non-transitory machine-readable medium of claim 1, further comprising:
a message processing rule that identifies a comparison between the received IMEISV to the stored IMEI and a result action of rejecting a request based on an outcome of the comparison, wherein the message processing rule comprises the instructions for comparing the received IMEISV to the stored IMEI to determine whether the user equipment is associated with the subscriber in the subscriber record; and the instructions for conditionally rejecting establishment of the session based on the determination of whether the user equipment is associated with the subscriber in the subscriber record; and
instructions for performing interpreted evaluation of the message processing rule.

6. The non-transitory machine-readable medium of claim 1, wherein the received subscriber identifier comprises at least one of an international mobile subscriber identity (IMSI) and a mobile subscriber integrated services digital network number (MSISDN).

7. The non-transitory machine-readable medium of claim 1, further comprising:
instructions for comparing the received subscriber identifier to the stored subscriber identifier to determine whether the subscriber identifier is associated with the subscriber in the subscriber record; and
instructions for conditionally rejecting establishment of the session based on the determination of whether the subscriber identifier is associated with the subscriber in the subscriber record.

8. A session establishment device comprising:
a network interface;
a memory device; and
a processor in communication with the memory device and the network interface, the processor being configured to: receive, via the network interface, a request message for establishment of a session with respect to a user device, wherein the request message includes a received subscriber identifier associated with a subscriber and a received international mobile station equipment identity software version (IMEISV) associated with the user device, obtain a subscriber record associated with the subscriber, wherein the subscriber record stores a stored subscriber identifier and a stored IMEI, compare the received IMEISV to the stored IMEI to determine whether the user equipment is associated with the subscriber in the subscriber record, and conditionally rejecting establishment of the session based on the determination of whether the user equipment is associated with the subscriber in the subscriber record.

9. The session establishment device of claim 8, wherein the subscriber record further stores an indication of whether services are suspended for the subscriber, the processor being further configured to: conditionally reject establishment of the session based on the indication of whether services are suspended for the subscriber.

10. The session establishment device of claim 9, wherein the subscriber record is locally stored in the memory device and the processor is further configured to: set a value of the indication of whether services are suspended for the subscriber in the subscriber record based on a message received from a user-accessible web portal server.

11. The session establishment device of claim 8, wherein, in comparing the received IMEISV to the stored IMEI to determine whether the user equipment is associated with the subscriber in the subscriber record, the processor is configured to: determine whether the stored IMEI is a substring of the received IMEISV.

12. The session establishment device of claim 8, wherein the processor is configured to: perform interpreted evaluation of a message processing rule stored in the memory device, wherein the message processing rule identifies a comparison between the received IMEISV to the stored IMEI and a result action of rejecting a request based on an outcome of the comparison, wherein the message processing rule configures the processor to compare the received IMEISV to the stored IMEI to determine whether the user equipment is associated with the subscriber in the subscriber record and to conditionally reject establishment of the session based on the determination of whether the user equipment is associated with the subscriber in the subscriber record.

13. The session establishment device of claim 8, wherein the received subscriber identifier comprises at least one of an international mobile subscriber identity (IMSI) and a mobile subscriber integrated services digital network number (MSISDN).

14. The session establishment device of claim 8, wherein the processor is further configured to: compare the received subscriber identifier to the stored subscriber identifier to determine whether the subscriber identifier is associated with the subscriber in the subscriber record; and conditionally reject establishment of the session based on the determination of whether the subscriber identifier is associated with the subscriber in the subscriber record.

15. A method for performing authentication, the method comprising:
receiving, at a session establishment device, a request message for establishment of a session with respect to a user device, wherein the request message includes a received subscriber identifier associated with a subscriber and a received international mobile station equipment identity software version (IMEISV) associated with the user device,
obtaining a subscriber record associated with the subscriber, wherein the subscriber record stores a stored subscriber identifier and a stored IMEI;

comparing the received IMEISV to the stored IMEI to determine whether the user equipment is associated with the subscriber in the subscriber record; and conditionally rejecting establishment of the session based on the determination of whether the user equipment is associated with the subscriber in the subscriber record.

16. The method of claim 15, wherein the subscriber record further stores an indication of whether services are suspended for the subscriber, the method further comprising:

conditionally rejecting establishment of the session based on the indication of whether services are suspended for the subscriber.

17. The method of claim 15, wherein comparing the IMEISV to the stored IMEI to determine whether the user equipment is associated with the subscriber in the subscriber record comprises:

determining whether the stored IMEI is a substring of the received IMEISV.

18. The method of claim 15, further comprising:

performing interpreted evaluation of a message processing rule that identifies a comparison between the received IMEISV to the stored IMEI and a result action of rejecting a request based on an outcome of the comparison, wherein the evaluation of the message processing rule includes performing the comparing the received IMEISV to the stored IMEI to determine whether the user equipment is associated with the subscriber in the subscriber record; and the conditionally rejecting establishment of the session based on the determination of whether the user equipment is associated with the subscriber in the subscriber record.

19. The method of claim 15, wherein the received subscriber identifier comprises at least one of an international mobile subscriber identity (IMSI) and a mobile subscriber integrated services digital network number (MSISDN).

20. The method of claim 15, further comprising:

comparing the received subscriber identifier to the stored subscriber identifier to determine whether the subscriber identifier is associated with the subscriber in the subscriber record; and conditionally rejecting establishment of the session based on the determination of whether the subscriber identifier is associated with the subscriber in the subscriber record.

* * * * *